United States Patent [19]

Iacoviello et al.

[11] 4,260,533

[45] Apr. 7, 1981

[54] VINYL ACETATE/ALLYLIC AMINE COPOLYMER EMULSIONS FOR PAINT HAVING WET ADHESION PROPERTIES

[75] Inventors: John G. Iacoviello, Somerville, N.J.; Wiley E. Daniels, Easton, Pa.

[73] Assignee: Air Products and Chemicals, Inc., Allentown, Pa.

[21] Appl. No.: 69,644

[22] Filed: Aug. 27, 1979

[51] Int. Cl.³ .............................................. C08L 55/00
[52] U.S. Cl. .................... 260/29.6 TA; 260/29.6 HN; 526/310; 428/500; 428/522
[58] Field of Search ................ 260/29.6 TA, 29.6 HN

[56] References Cited

U.S. PATENT DOCUMENTS

| | | | |
|---|---|---|---|
| 2,628,221 | 2/1953 | Marsh | 260/29.6 HN |
| 2,662,875 | 12/1953 | Chaney | 260/29.6 HN |
| 2,727,019 | 12/1955 | Melamed | 528/391 |
| 2,881,171 | 4/1959 | Hankins | 260/29.6 HN |
| 2,926,161 | 2/1960 | Butler et al. | 260/29.6 HN |
| 2,940,950 | 6/1960 | Gusman | 260/32.8 |
| 2,980,652 | 4/1961 | Melamed et al. | 528/44 |
| 3,032,539 | 5/1962 | Schuller et al. | 260/29.6 HN |
| 3,043,816 | 7/1962 | Martin | 260/29.6 HN |
| 3,057,833 | 10/1962 | Devlin | 260/29.6 HN |
| 3,356,654 | 12/1967 | Sekmakas | 260/29.6 HN |
| 3,366,613 | 1/1968 | Kelley | 260/29.6 HN |
| 3,369,008 | 2/1968 | Hurwitz | 260/29.6 TA |
| 3,509,085 | 4/1970 | Sekmakas | 260/29.6 HN |
| 3,544,491 | 12/1970 | Benischeck | 260/29.6 TA |
| 4,111,877 | 9/1978 | Dtzon et al. | 260/29.6 R |
| 4,121,986 | 10/1978 | Battaerd | 204/159.22 |
| 4,151,142 | 4/1979 | Herman et al. | 260/29.6 R |

*Primary Examiner*—Harold D. Anderson
*Attorney, Agent, or Firm*—Eugene E. Innis; Russell L. Brewer

[57] ABSTRACT

This invention relates to latex compositions for use as a paint vehicle particularly for the manufacture of interior semi-gloss and flat exterior paint compositions. The latex composition comprises from about 40-70% by weight of resin particles, the resin particles having at least 25% vinyl acetate polymerized therein, and from about 0.5-10% of a copolymerizable allylic amine having at least one allylic group attached directly to an amino nitrogen and at least one hydrogen atom attached directly to an amino nitrogen atom. In a preferred instance, the resin particles comprise vinyl acetate, a lower alkyl acrylate or ethylene, optionally vinyl chloride and the allylic amine.

9 Claims, No Drawings

VINYL ACETATE/ALLYLIC AMINE COPOLYMER EMULSIONS FOR PAINT HAVING WET ADHESION PROPERTIES

BACKGROUND OF THE INVENTION

1. Field of the Invention

This invention relates to paint compositions containing a unique emulsion or vehicle as they are sometimes called, particularly suited for semi-gloss and flat interior paint compositions. Latex paint compositions have captured a significant portion of the indoor and outdoor paint market because they have many advantages to solvent based paint products. Three significant advantages are: the paints offer an easy mechanism for cleanup, there is substantially no air pollution, and there is a reduced possibility of fire hazard. On the other hand, the coating properties and storage stability of the latex paints have been somewhat inferior to those of the solvent type, particularly in obtaining desired film thickness and obtaining good adhesion. Two types of emulsions commonly used in formulating latex paints include the all acrylic system, e.g. the systems using copolymerized methyl methacrylate, butyl acrylate, 2-ethylhexyl acrylate with small proportions of acrylic acid, etc. as may be desired, and vinyl acetate formulations usually in combination with a small proportion of dibutyl maleate or a lower alkyl acrylate, e.g. 2-ethylhexyl acrylate, methyl methacrylate, or butyl acrylate. Heretofore, the all acrylic systems have been used in premium quality paints as the emulsions have provided for good water resistance, desired leveling, film hardness, durability, scrubbability, etc. The vinyl acetate-acrylic copolymer systems have been utilized in formulating interior flat and semi-gloss paints and exterior house paints, and the vinyl acetate-butyl acrylate latices result in paint films with excellent toughness, scrub resistance and durability, while the vinyl acetate-dibutyl maleate emulsions have good abrasion resistance and flexibility as well as durability.

Wet adhesion, i.e. the quality of adhering to the previously, aged surface under wet or moist conditions, has been imparted to both the acrylic systems and vinyl acetate systems by polymerizing a wet adhesion monomer into the copolymer. Typically, these wet adhesion monomers have terminal olefinic unsaturation at one end and a terminal ureido or urea functionality at the other end of the monomer. Specific examples of conventional wet adhesion monomers are shown in U.S. Pat. Nos. 2,881,171; 3,369,008; 3,366,613; 2,940,950; 2,727,019; 3,509,085; 2,980,652; 3,356,654 and 4,111,877; and 4,151,142.

2. Description of the Prior Art

Allylamine, diallylamine and substituted derivatives thereof have been utilized to produce various polymer systems. Examples of these polymer systems are shown in U.S. Pat. No. 2,628,221 which discloses the solution polymerization of vinyl acetate and a tertiary amino nitrogen compound, e.g. N,N-dimethyl allylamine. Optionally, various monomers could be utilized in the mixture, and these include esters such as vinyl propionate, vinyl butyrate, and the like.

U.S. Pat. No. 3,057,833 discloses a process for polymerizing allylamines with various monomer compositions containing ethylenic unsaturation, e.g. lower alkyl acrylates and vinyl esters. The polymers produced can be used in a variety of applications to form polyamides by reaction with polyisocyanates or react with various polycarboxylic acids to form coatings.

U.S. Pat. No. 3,032,539 discloses a process for preparing copolymers of allylamine derivates such as diallylamine, dimethyl allylamine and the like with various copolymerizable monomers such as styrene, lower alkyl acrylates, acrylamides, and vinyl acetates. The linear copolymers formed have the capability of being reacted with an aldehyde, e.g. formaldehyde to form a thermosetting resinous composition.

U.S. Pat. No. 2,662,875 discloses a process for preparing dye receptive polymeric material from allylamine and acrylonitrile. The ternary polymers formed contain at least 80% acrylonitrile, at least 1% allylamine, at least 1% of the copolymerizable monomer such as vinyl acetate, styrene, lower alkyl acrylates, etc.

U.S. Pat. No. 2,926,161 discloses a process for producing linear homopolymers of diallylamine by carrying out the polymerization in the presence of an acid to form a salt.

U.S. Pat. No. 4,121,986 discloses a process for preparing polyallylamines by carrying out the polymerization in the presence of a mineral acid solution.

U.S. Pat. No. 3,043,816 discloses a process for producing vinyl chloride in polymer systems as a wire insulation coating and the copolymer comprising the reaction product of vinyl chloride and diallylamine, the diallylamine being present in a proportion of from about 0.003–0.3 weight percent.

SUMMARY OF THE INVENTION

This invention relates to latex compositions particularly suited for the manufacture of paints, e.g. semi-gloss and interior paint compositions. The emulsion contains water and from about 40–70% by weight of polymerized resin particles, the resin particles being formed by the polymerization of vinyl acetate, a copolymerizable monomer and a copolymerizable allylic amine having at least one allyl group attached directly to the nitrogen atom and at least one hydrogen atom attached directly to the amino nitrogen atom.

In the polymerized resin particles, the vinyl acetate content is at least 25% and preferred latex compositions contain the following proportion of vinyl acetate and ethylene or lower alkyl acrylate and, in another sense, a tetrapolymer having a proportion of a 25–26% vinyl chloride, 30–65% vinyl acetate, 10–15% ethylene and 0.2 to 2.5% of the allylic amine.

There are several advantages associated with the latex composition for use in paints, and these include:

an ability to form a latex composition particularly adapted for forming semi-gloss and interior paints with the resulting paint composition having wet adhesion characteristics;

an ability to form a latex composition which has functional sites for cross-linking with various materials to provide unique coating characteristics and yet retain wet adhesion properties; and an ability to utilize commercially available monomer systems which are economical to produce e.g. low cost vinyl acetate latex compositions for paint use.

DESCRIPTION OF PREFERRED EMBODIMENTS

The latexes or emulsions suited for forming paint compositions can be referred to as vinyl acetate latices. These latices contain polymerized resin particles which will contain at least 25%, and generally from about 80–95% vinyl acetate, 15–20% of a comonomer, e.g. a lower alkyl acrylate or olefin and 0.5–10% by weight of the copolymerizable allylic amine as the wet adhesion monomer. The particular emulsion system best suited for interior semi-gloss applications is a vinyl acetate-butyl acrylate or vinyl acetate-ethylene copolymer with the wet adhesion allylicamine monomer interpolymerized therein. In that instance, the vinyl acetate content generally is from about 80–95% by weight, and preferably 85–95% by weight, the butylacrylate or ethylene content from about 4.5–18.5% and the wet adhesion allylic amine monomer at about 0.5–10% by weight.

Other copolymerizable monomers suited for polymerization with the vinyl acetate include lower alkyl acrylates, e.g. a $C_1$–$C_6$ ester of acrylic or methacrylic acid which includes methylmethacrylate, ethylacrylate, butylacrylate, 2-ethylhexyl acrylate; olefins, e.g. ethylene; alkyl esters of alpha-beta unsaturated dicarboxylic acids, e.g. dibutyl maleate, dibutyl fumarate; vinyl chloride, vinyl esters, e.g. vinyl butyrate, vinyl propionate; and unsaturated carboxylic acid amides, e.g. acrylamide and methacrylamide. But, of course, the butyl acrylate, ethylene monomers are the preferred ones performing the emulsions for use in the paint applications.

A tetrapolymer containing substantial quantities of vinyl acetate can also be used in forming a latex composition, and in this instance, a composition containing from 25–65% vinyl chloride, 30–65% vinyl acetate, 10–15% ethylene and 0.5–10% weight of the allylic amine wet adhesion monomer is satisfactory. The presence of vinyl chloride in the polymerized resin particle greatly enhances the toughness and flexibility of the film and also provides economic factors.

Wet adhesion in the latex, which is required in most paint applications, is obtained by the interpolymerization of an amine having allylic functionality directly attached to the amino nitrogen atom and at least one hydrogen atom attached directly to the amino nitrogen atom. Typically this amine is represented by the formulas:

$$CR_1R_2=CR_3-CR_1R_2-NR_1H$$

and $$(CR_1R_2=CR_3-CR_1R_2)_2NH$$

wherein $R_1$ and $R_2$ are lower alkyl groups having from 1–6 carbon atoms in the structure, phenyl groups, and hydrogen;

$R_3$ is a lower group having from 1–6 carbon atoms, a phenyl group, and hydrogen.

Examples of allylamines within the formulas include allylamine, diallylamine, N-methyl allylamine, N,ethyl allylamine, N-benzyl allylamine and the like. From this list it is readily noted that the amines are primary and secondary allylic amines as the tertiary amines, even though polymerizable with vinyl acetate and other copolymerizable systems, do not provide the desired wet adhesion characteristics in the resulting emulsion. In view of this lack of wet adhesion, the latexes are inferior for use in paints, at least to the extent of not providing wet adhesion. Unsubstituted allylic amines, e.g. generally allyl and diallylamine are preferred as copolymerizability, generally diminishes as the degree of substitution increases.

The copolymerizable allylic amines represented above are included in the polymerized resin particles in a proportion of from about 0.5–10% by weight. In most cases, the percent allylic amine is from about 0.75–3% by weight. One of the advantages of the allylic amines, and the reason for their use in higher proportions than conventional wet adhesion monomers, is that a fraction of the amines can be cross-linked or reacted with various amine reactive compounds to provide unique properties in the polymer without significantly affecting the wet adhesion characteristics. For example, where a polymerized resin particle contains levels of approximately 10% by weight of the allylic amine, 50–75% of the allylic amine can be reacted with various amine reactive compounds leaving a fraction of the amine for purposes of conferring wet adhesion to the paint made from the emulsion. When the proportion of allylic amine is less than 0.5%, there generally is insufficient functional monomer to provide the desired wet adhesion characteristics required in the paint composition.

The polymerization of the allylic amine proceeds by conventional free radical polymerization with the exception that the allylic amines should be converted to the salt form when polymerizing in an aqueous system. It is extremely difficult to polymerize the allylic amines in their salt-free state. The amine salts can be formed by simply adding a mineral acid to the aqueous medium, the acid being added in sufficient quantity to reduce the pH to a level of about 2–4. Examples of mineral acids which can be added include hydrochloric acid, nitric acid, sulfuric acid, and various organic acids. Of these, hydrochloric acid is preferred. Other conventional techniques for polymerizing allylic amines with other comonomers in aqueous systems can be utilized.

The latex can be stabilized by the use of protective colloids, e.g. a partially hydrolized polyvinyl alcohol such as one containing a hydrolysis value of 80–93%, hydroxyethyl cellulose, and others commonly used in the art. These protective colloids can be used in conventional amounts, e.g. 0.05–2% by weight of the monomers, preferably about 0.8–1.5% by weight of the monomers.

Surfactants can also be used in preparing the latex compositions, and their use is known in emulsion polymerization. Typically, the surfactants are included in a proportion of 0.5–5% by weight of the latex. Nonionic emulsifying agents are preferred and these include polyoxyethylene condensates, e.g. polyoxyethylene aliphatic ethers and polyoxyethylene aralkyl ethers. Preferred nonionic emulsifying agents are sold under the trademark "PLURONIC" and have the formula:

$$HO(C_2H_4O(a))C_3H_6O(b)C_2H_4O(c)H$$

where a, b, and c are integers of 1 (or above) and include polyoxyethylene-polyoxypropylene glycols, in which the polyoxypropylene chain has a molecular weight of 1500–1800, and the polyoxyethylene content is from about 40–90% of the total weight of the molecule.

Examples of preferred surfactants are PLURONIC F-68 and PLURONIC L-64, both being a polyoxyethylene-polyoxypropylene glycol, but with F-68 having a polyoxyethylene content of 80–90% and L-64 having a polyoxyethylene content of 40–50% by weight of the molecule.

Another class of nonionic surfactants are sold under the trademark "IGEPAL" and are generally polyoxyethylene air-alkyl ether such as polyoxyethylene nonyl phenyl ether. Two preferred surfactants include IGEPAL CO-630, which has a cloud point between 126°-133° F. and IGEPAL CO-887, which has a cloud point above 221° F. Both are polyoxyethylene nonyl phenyl ethers.

The polymerization of the monomer system is a free radical polymerization, and the polymerization is initiated by use of a redox system. The redox system, as known, comprises an oxidizing agent and a reducing agent. The oxidizing and reducing components can be any of those conventionally used in vinyl acetate emulsion polymerization. Examples of preferred oxidizing components are hydrogen peroxide, potassium persulfate, t-butyl peroxypivalate, etc., and preferred reducing agents are ferrous ammonium sulfate and sodium or zinc formaldehyde sulfoxylate.

The following examples are provided to illustrate preferred embodiments of the invention are not intended to restrict the scope thereof.

EXAMPLE 1

The preparation of a vinyl acetate-n butylacrylate-N,N-diallylamine copolymer latex composition was conducted by carrying out the polymerization in a two liter resin kettle equipped with a stainless steel stirrer, thermometer, condenser and monomer and water inlets. An initial charge of water, protective colloid surfactant and free radical initiator was charged to the vessel, the recipe being as follows:

| Ingredient | Grams |
| --- | --- |
| Deionized water | 172 |
| Natrosol - 250 LR (2.0 Hydroxyethyl cellulose solution) | 360 |
| Igepal CO-887 | 15.6 |
| Igepal CO-630 | 3.66 |
| Pluronic F-68 | 2.74 |
| Pluronic L-64 | 0.91 |
| Sodium Persulfate | 3 |
| Ferrous Sulfate | 0.1 |
| Sodium Benzoate | 2 |

The contents in the kettle were heated to 60° C. while under constant agitation speed of 120 RPM and under a nitrogen purge. Two separate monomer feed systems were added to the kettle over a period of 2.5 hours. The recipes were as follows:

| Feed 1 | Grams |
| --- | --- |
| Vinyl Acetate | 810 |
| Butylacrylate | 90 |

| Feed 1 | Grams |
| --- | --- |
| Pluronic F-68 | 8.23 |
| Pluronic L-64 | 2.74 |
| t-butyl hydroperoxide (70%) | 5 |

| Feed 2 | Grams |
| --- | --- |
| Deionized Water | 60 |
| Diallylamine | 45 |

The aqueous phase (Feed 2) was prepared by chilling the water-diallylamine mixture and forming the diallylamine HCL salt by adjusting the pH of the aqueous phase to 2.5 with a 50/50 HCL-water solution.

A 5% activator solution consisting of 90 grams water and 10 grams sodium formaldehyde sulfoxylate was added to the kettle along with the monomer and aqueous additions at a rate to maintain the free vinyl acetate content at 4–5% with a polymerization temperature between 60°–65° C. When both monomer and aqueous recipes were completely added, the free vinyl acetate in the resulting latex was reduced to below 0.5% by weight by adding a catalyst solution containing 1.5 grams of t-butylhydroperoxide dissolved in 15 grams of deionized water and an excess of the 5% activator solution. At the end of the polymerization the pH of the latex was 2.1 and lower from the initial pH of 5.5. After polymerization the pH was increased to 5.5 by addition of 10% sodium hydroxide. The polymerized resin particles were calculated to have 85.7% vinyl acetate, 9.52% butylacrylate, and 4.76% N,N-diallylamine concentration. The solids content was 56% and the particle size was of uniform monodisperse size.

EXAMPLE 2

The procedure of Example 1 was repeated producing several vinyl acetate, butylacrylate, diallylamine and vinyl acetate-butylacrylate-allylamine resin systems. The proportion of diallylamine and allylamine was varied as indicated in Table 1. The results are as follows:

TABLE 1

| | | | | | | | | |
| --- | --- | --- | --- | --- | --- | --- | --- | --- |
| POLYMERIZATIONS WITH ALLYL AND DIALLYLAMINES | | | | | | | | |
| | | | Other Monomers | | | Polym. Temp. °C. | Polym. Temp. Hrs. | |
| Run | Amine | % Amine | Vinyl Acetate | Butyl Acrylate | Catalyst | | | % Solids |
| 1 | Diallyl | 3.0 | 88.5 | 8.5 | $Na_2S_2O_8$ | 60–62 | 2–2½ | 49 |
| 2 | " | 4.0 | 88 | 8 | " | " | " | 57.4 |
| 3 | " | 5.0 | 87.5 | 7.5 | " | " | " | 56.0 |
| 4 | " | 1.0 | 89.5 | 9.5 | " | " | " | Viscous |
| 5 | " | 0.75 | 89.7 | 9.6 | " | " | " | 54.6 |
| 6 | " | 0.5 | 89.8 | 9.7 | " | " | " | 54.8 |
| 7 | Allyl | 0.75 | 89.7 | 9.6 | " | " | " | 53.0 |
| 8 | " | 1.0 | 89.5 | 9.5 | " | " | " | 53.8 |
| 9 | " | 2.0 | 89 | 9 | " | " | " | 55.0 |
| 10 | " | 3.0 | 88.5 | 8.5 | " | " | " | 53.8 |
| 11 | " | 4.0 | 88 | 8 | " | " | " | 51.4 |
| 12 | " | 5.0 | 87.5 | 7.5 | " | " | " | 55.0 |

EXAMPLE 3

Semi-Gloss Paint Screening Formula

A standard paint formulation for semi-gloss application containing pigment and thickener was used to compare various emulsions prepared in Example 1, as well as commercial vinyl acetate-lower alkyl acrylate-wet adhesion monomer systems. The formulation was as follows:

| COMPOUND | GRAMS |
|---|---|
| Propylene glycol | 65 |
| Tamol 731 (dispersant) | 14 |
| Foamaster 44 (defoamer) | 2 |
| AMP 95 (aminomethyl propanol | 1 |
| Ti -Pure R-900-titanium dioxide (pigment) | 275 |
| Water | 60 |
| Aerosol OT, (75% sodium dioctyl succinate) | 2 |
| Carbitol acetate | 15 |
| Natrosol 250 MR, 3% hydroxy ethyl Cellulose | 75 |
| Merbac 35 (Pigment) | 1 |
| Water* and/or Natrosol solution | 90 |
| Test or Control Emulsion @ 55% solids | 460 |

*Water and Natrosol varied to maintain viscosity in commerciallyusable range, generally 82 ± 2Ku (Krebs Units)

The paint compositions were then tested for floating board test, cut film wet adhesion test. A brief description of each individual test is as follows:

FLOATING BOARD TEST

A 6 inch by 6 inch piece of clear white pine was first coated with an alkyd enamel paint and then with an alkyd gloss enamel and allowed to dry for a minimum of 3 days. The test paints were applied to the alkyd coated pine board in liberal quantity and allowed to dry for 3 days at 75° F. and 58% relative humidity. Using a sharp knife or scribe, a series of parallel cuts approximately 1/10 inch apart were made and formed into a 100 square pattern. A strip of masking tape was applied to the cut section and rubbed with the thumb to insure contact. The tape then was pulled sharply at a 90° angle, and the percent paint removed from the alkyl substrate noted. A second series of cuts were made in the top paint film and the board placed face down in tap water. After one hour, the board was removed from water, wiped dry and tape applied to the cross hatched area and pulled. The percent remaining was recorded. A low percent removal of paint indicates good wet adhesion and a high removal indicates poor wet adhesion.

CUT FILM WET ADHESION TEST

A Leneta metal scrub panel was coated with an alkyd enamel using a 7 mil side of a Dow Film Caster and allowed to dry a minimum of three days and maximum of nine days at 75° F. at 50% relative humidity. Test paints were applied to the panel using a drawdown bar suitable to give a 2 mil dry film thickness. The paint was allowed to dry 72 hours at 75° F., 50% relative humidity. A cut was made completely through the surface and down the center of the drawdown of the test paint with the razor blade held at a 45° angle. The panel was placed on a Gardner Washability Machine and scrubbed under water with a standard hog bristle brush, presoaked in water.

The results are shown in Table 2.

| Run | Floating Board Dry | Floating Board Wet | Cut Film First Cut | Cut Film Recut |
|---|---|---|---|---|
| Control A | 0 | 8 | Passed | Passed |
| 4 | 0 | 0 | " | " |
| 5 | 0 | 12 | " | " |
| 6 | 0 | 5 | " | " |
| 7 | 0 |  | " | " |
| 8 | 0 |  | " | " |

Control A is a commercially available vinyl acetate-butyl acrylate system having 0.75% by weight of a wet adhesion monomer. This control is sold under the trademark WAVE 345 by Air Products and Chemicals, Inc. The Run number corresponds to the Run from Table 1.

The results in Table 2 show that both allyl and diallylamine impart wet adhesion to a paint system. The results are similar to those obtained with the commercial emulsion system.

What is claimed is:

1. A latex paint composition comprising water, pigment, thickener and about 40-70% by weight resin particles, wherein said resin particles contain at least 25% by weight vinyl acetate units and 0.5-10% by weight of units of an allylic amine wet adhesion monomer, said allylic amine having at least one allylic group and at least one hydrogen atom attached directly to the amino nitrogen atom.

2. The paint composition of claim 1 wherein said resin particles contain from about 5-20% by weight of units of a monomer selected from the group consisting of ethylene and an alkyl acrylate selected from the group consisting of butyl, methyl and 2-ethylhexyl acrylate.

3. The paint composition of claim 2 wherein the allylic amine is represented by the formulas:

$$CR_1R_2=CR_3-CR_1R_2NR_1H \text{ and}$$

$$(CR_1R_2=CR_3-CR_1R_2)_2NH$$

wherein $R_1$, $R_2$ and $R_3$ are lower alkyl groups having from 1-6 carbon atoms, phenyl groups, or hydrogen.

4. The paint composition of claim 3 wherein $R_2$ is hydrogen.

5. The paint composition of claim 4 wherein $R_1$ is hydrogen.

6. The paint composition of claim 5 wherein $R_3$ is hydrogen.

7. The paint composition of claim 6 where the resin particles have from about 1-5% of said allylic amine unit.

8. The paint composition of claim 7 wherein said resin particle contains from 80-95% by weight vinyl acetate units, 5-18.5% by weight butyl acrylate units, and from about 0.5-10% by weight of wet adhesion monomer units.

9. The paint composition of claim 7 wherein the resin particle contains from 25-65% by weight vinyl chloride units, 30-65% by weight vinyl acetate units, 10-15% by weight ethylene units and 0.5% by weight of the allylic amine units.

* * * * *